United States Patent
Kim et al.

(10) Patent No.: US 9,493,168 B1
(45) Date of Patent: Nov. 15, 2016

(54) METHOD AND APPARATUS FOR CONTROLLING A CONTROL VARIABLE OF A POWERTRAIN SYSTEM

(71) Applicant: GM GLOBAL TECHNOLOGY OPERATIONS LLC, Detroit, MI (US)

(72) Inventors: Kee Yong Kim, Ann Arbor, MI (US); Anthony H. Heap, Ann Arbor, MI (US); Jeremy Wise, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/737,616

(22) Filed: Jun. 12, 2015

(51) Int. Cl.
| | |
|---|---|
| *G06F 17/00* | (2006.01) |
| *B60W 50/06* | (2006.01) |
| *F16H 61/10* | (2006.01) |
| *B60W 10/06* | (2006.01) |
| *B60W 10/10* | (2012.01) |
| *F16H 63/50* | (2006.01) |

(52) U.S. Cl.
CPC .............. *B60W 50/06* (2013.01); *B60W 10/06* (2013.01); *B60W 10/10* (2013.01); *F16H 61/10* (2013.01); *F16H 63/50* (2013.01)

(58) Field of Classification Search
None
See application file for complete search history.

(56) References Cited

U.S. PATENT DOCUMENTS

| | | | | |
|---|---|---|---|---|
| 8,116,925 B2* | 2/2012 | Wang | ....................... | B60K 6/46 |
| | | | | 180/65.8 |
| 8,180,510 B2* | 5/2012 | Yokouchi | .............. | B60K 6/365 |
| | | | | 701/22 |

* cited by examiner

*Primary Examiner* — Dirk Wright
(74) *Attorney, Agent, or Firm* — Quinn Law Group, PLLC

(57) ABSTRACT

A powertrain system is described, including a method for controlling a control variable for an element thereof. The method includes determining an initial state transition threshold and an associated hysteresis band for an operating parameter related to the control variable. The hysteresis band is decayed based upon operation in a present state of the control variable for powertrain element, and a preferred control variable for the powertrain element is selected based upon a comparison of the operating parameter and the initial state transition threshold accounting for the decayed hysteresis band for the operating parameter. The element of the powertrain system is controlled to the preferred state for the control variable.

18 Claims, 2 Drawing Sheets

METHOD AND APPARATUS FOR CONTROLLING A CONTROL VARIABLE OF A POWERTRAIN SYSTEM

TECHNICAL FIELD

The present disclosure relates to powertrain systems for vehicles, and associated control routines associated therewith.

BACKGROUND

Powertrain systems operate in response to operator requests and other conditions. Such operation includes controlling one or a plurality of control variables, such as a selected transmission gear, engine ON/OFF, and others. Controlling and changing various control variables may be executed to optimize operation, including changing a control variable to reduce power loss, to reduce power consumption, and improve performance. As such, a control variable may change in response to a change in an operating condition, including by way of example an input from the vehicle operator, an input related to external operating conditions, or an input related to operation of the powertrain system.

A change in a control variable, e.g., a change between engine ON and OFF states or a change between fixed transmission gear ratios, may include some hysteresis to minimize state transitions that may lead to operator dissatisfaction and/or affect service life of one or more components such as electric starter motors and the like. However, continued operation within a hysteresis window at a non-optimal state may increase power consumption.

SUMMARY

A powertrain system is described, including a method for controlling a control variable for an element thereof. The method includes determining an initial state transition threshold and an associated hysteresis band for an operating parameter related to the control variable. The hysteresis band is decayed based upon operation in a present state of the control variable for powertrain element, and a preferred control variable for the powertrain element is selected based upon a comparison of the operating parameter and the initial state transition threshold accounting for the decayed hysteresis band for the operating parameter. The element of the powertrain system is controlled to the preferred state for the control variable.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
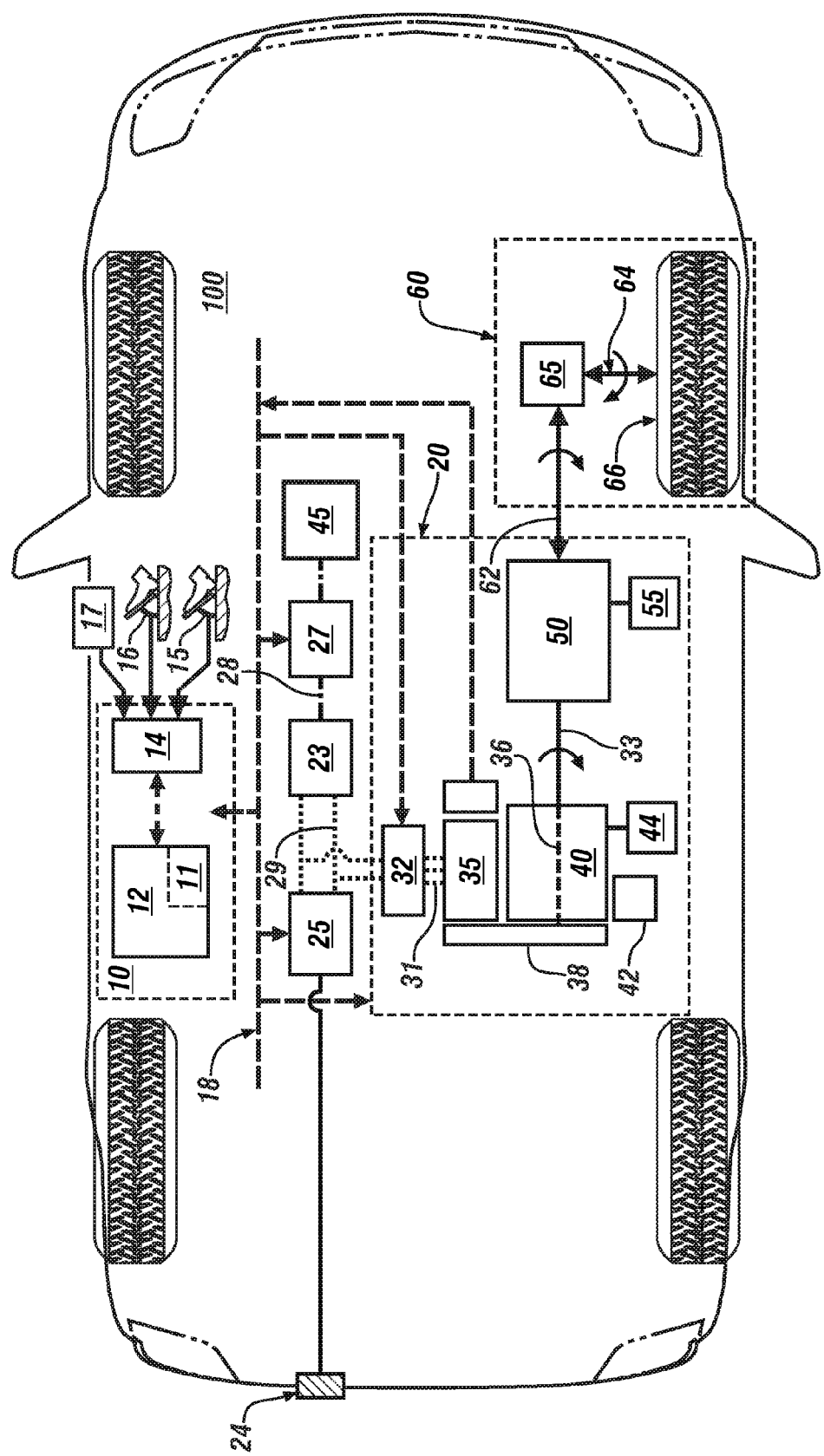
FIG. 1 schematically shows a vehicle including a powertrain system coupled to a driveline and controlled by a control system, in accordance with the disclosure.

Referring now to the drawings, wherein the showings are for the purpose of illustrating certain exemplary embodiments only and not for the purpose of limiting the same, FIG. 1 schematically shows a vehicle 100 including a powertrain system 20 coupled to a driveline 60 and controlled by a control system 10. Like numerals refer to like elements throughout the description. The illustrated powertrain system 20 includes multiple torque-generating devices including an internal combustion engine 40 and at least one electrically-powered torque machine (electric machine) 35 that transfer torque through a transmission 50 to a driveline 60. The concepts described herein may apply to any suitable powertrain configuration that includes the internal combustion engine 40 coupled to the driveline 60 via the transmission 50.

In one embodiment, the powertrain system 20 includes the torque machine 35 rotatably mechanically coupled to a crankshaft 36 of the engine 40 that rotatably mechanically couples to an input member 33 of the transmission 50. The mechanical coupling may include a torque converter, a clutch, or another mechanism. As shown, the crankshaft 36 mechanically rotatably couples to the torque machine 35 via a pulley mechanism 38. The pulley mechanism 38 is configured to effect torque transfer between the engine 40 and the torque machine 35, including transferring torque from the torque machine 35 to the engine 40 for engine autostart and autostop operations, tractive torque assistance, torque transfer for regenerative vehicle braking, and torque transfer from engine 40 to the torque machine 35 for high-voltage electrical charging. In one embodiment, the pulley mechanism 38 includes a serpentine belt routed between a first pulley attached to the crankshaft 36 of the engine 40 and a second pulley attached to a rotating shaft coupled to a rotor of the torque machine 35, referred to as a belt-alternator-starter (BAS) system. Alternatively, the pulley mechanism 38 may include a positive-displacement gearing mechanism, or another suitable positive mechanical connection. As such, the electrically-powered torque machine 35 can be employed to rotate the engine 40. Other configurations of the multi-mode powertrain system 20 that include the torque machine 35 rotatably mechanically coupled to the engine 40 may be employed within the scope of this disclosure.

The engine 40 is preferably a multi-cylinder internal combustion engine that converts fuel to mechanical torque through a thermodynamic combustion process. The engine 40 is equipped with a plurality of actuators and sensing devices for monitoring operation and delivering fuel to form in-cylinder combustion charges that generate an expansion force onto pistons that is transferred to the crankshaft 36 to produce torque. The engine 40 may include a low-voltage solenoid-actuated electrical starter 42 for engine starting in response to a key-crank event in one embodiment.

The engine 40 is preferably controlled by an engine controller (ECM) 44, including controlling engine operation in one or more various states including, an ON state, an OFF state, an all-cylinder state, a cylinder deactivation state, a fueled state and a fuel cutoff (FCO) state. The engine 40 is preferably mechanized with suitable hardware and the ECM 44 preferably includes suitable executable routines to execute autostart and autostop functions, fuel cutoff (FCO) functions and cylinder deactivation functions during ongoing operation of the powertrain system 20. The engine 40 is considered to be in an OFF state when it is not rotating. The engine 40 is considered to be in an ON state when it is rotating, including one or more FCO states in which the engine 40 is spinning and unfueled. The cylinder deactivation state includes engine operation wherein one or a plurality of the engine cylinders are deactivated by unfueled, unfired, and preferably operating with engine exhaust valves in open states to minimize pumping losses, while remaining cylinders are fueled, firing and producing torque. Engine mechanizations and control routines for executing autostart, autostop, FCO and cylinder deactivation routines are known and not described herein.

One exemplary transmission 50 is a multi-ratio fixed-gear torque transmission device that is configured to automatically shift gears at predetermined speed/torque shift points. The transmission 50 is configured to operate in one of a plurality of selectable fixed-gear ratios that achieves a preferred match between an operator torque request and an engine operating point, and preferably employs one or a plurality of differential gear sets and hydraulically-activated clutches to effect gear shifting to permit torque transfer in one of the selectable fixed gear ratios over a range of speed ratios between the input member 33 and output member 62. The transmission 50 may be controlled using a controllable hydraulic circuit that communicates with a transmission controller (TCM) 55. The transmission 50 executes upshifts to shift to a fixed gear that has a lower numerical multiplication ratio (gear ratio) and executes downshifts to shift to a fixed gear that has a higher numerical multiplication ratio. A transmission upshift may require a reduction in engine speed so the engine speed matches transmission output speed multiplied by the gear ratio at a gear ratio associated with a target gear state. A transmission downshift may require an increase in engine speed so the engine speed matches transmission output speed multiplied by the gear ratio at a gear ratio associated with the target gear state.

The electric machine 35 is preferably a high-voltage multi-phase electric motor/generator configured to convert stored electric energy to mechanical power and convert mechanical power to electric energy that may be stored in a high-voltage energy storage device (battery) 25. The battery 25 may be any high-voltage energy storage device, e.g., a multi-cell lithium ion device, an ultra-capacitor, or another suitable device without limitation. Monitored parameters related to the battery 25 preferably include a state of charge (SOC), temperature, and others. In one embodiment, the battery 25 may electrically connect via an on-vehicle battery charger 24 to a remote, off-vehicle electric power source for charging while the vehicle 100 is stationary. The battery 25 electrically connects to an inverter module 32 via a high-voltage DC bus 29 to transfer high-voltage DC electric power via three-phase conductors 31 to the electric machine 35 in response to control signals originating in the control system 10.

The electric machine 35 preferably includes a rotor and a stator, and electrically connects via the inverter module 32 and the high-voltage bus 29 to the high-voltage battery 25. The inverter module 32 is configured with suitable control circuits including power transistors, e.g., IGBTs for transforming high-voltage DC electric power to high-voltage AC electric power and transforming high-voltage AC electric power to high-voltage DC electric power. The inverter module 32 preferably employs pulsewidth-modulating (PWM) control of the IGBTs to convert stored DC electric power originating in the high-voltage battery 25 to AC electric power to drive the electric machine 35 to generate torque. Similarly, the inverter module 32 converts mechanical power transferred to the electric machine 35 to DC electric power to generate electric energy that is storable in the battery 25, including as part of a regenerative control strategy. The inverter module 32 receives motor control commands and controls inverter states to provide the motor drive and regenerative braking functionality. In one embodiment, a DC/DC electric power converter 23 electrically connects to the high-voltage bus 29, and provides electric power to a low-voltage battery 27 via a low-voltage bus 28. Such electric power connections are known and not described in detail. The low-voltage battery 27 electrically connects to an auxiliary power system to provide low-voltage electric power to low-voltage systems 45 on the vehicle, including, e.g., electric windows, HVAC fans, seats, and the low-voltage solenoid-actuated electrical starter 42.

The driveline 60 may include a differential gear device 65 that mechanically couples to an axle 64, transaxle or half-shaft that mechanically couples to a wheel 66 in one embodiment. The driveline 60 transfers tractive power between the transmission 50 and a road surface.

The control system 10 includes controller 12 that signally connects to an operator interface 14. The controller 12 preferably includes a plurality of discrete devices that are co-located with the individual elements of the powertrain system 20 to effect operational control of the individual elements of the powertrain system 20, including, e.g., the inverter module 32, the ECM 44 and the TCM 55. The controller 12 may also include a control device that provides hierarchical control of other control devices. The controller 12 communicates with each of the battery charger 24, the inverter module 32, the ECM 44 and the TCM 55, either directly or via a communications bus 18 to monitor operation and control operations thereof.

The operator interface 14 of the vehicle 100 includes a controller that signally connects to a plurality of human/machine interface devices through which the vehicle operator commands operation of the vehicle 100. The human/machine interface devices include, e.g., an accelerator pedal 15, a brake pedal 16 and a transmission range selector (PRNDL) 17. Other human/machine interface devices preferably include an ignition switch to enable an operator to crank and start the engine 40, a steering wheel, and a headlamp switch. The accelerator pedal 15 provides signal input indicating an accelerator pedal position and the brake pedal 16 provides signal input indicating a brake pedal position. The transmission range selector 17 provides signal input indicating direction of operator-intended motion of the vehicle including a discrete number of operator-selectable positions indicating the preferred rotational direction of the output member 62 in either a forward or a reverse direction.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component 11 in the form of memory and storage devices (read only, programmable read only, random access, hard drive, etc.). The non-transitory memory component 11 is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds or 3.125, 6.25, 12.5, 25 and 100 milliseconds during ongoing operation. Alternatively, routines may be executed in response to occurrence of a triggering event. Communications between controllers and between controllers, actuators and/or sensors may be accomplished using a direct wired link, a networked communications bus link, a wireless link, a serial peripheral interface bus or any another suitable communications link. Communications includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Vehicle operation responsive to operator requests includes operating modes of accelerating, braking, steady-state running, coasting, and idling. The acceleration mode includes an operator request to increase vehicle speed. The braking mode includes an operator request to decrease vehicle speed. The steady-state running, includes vehicle operation wherein the vehicle is presently moving at a rate of speed with no operator request for either braking or accelerating, with the vehicle speed determined based upon the present vehicle speed and vehicle momentum, vehicle wind resistance and rolling resistance, and driveline inertial drag. The coasting mode includes vehicle operation wherein vehicle speed is above a minimum threshold and the operator request to the accelerator pedal is at a point that is less than required to maintain the present vehicle speed. The idle mode includes vehicle operation wherein vehicle speed is at or near zero with the transmission range selector in a non-propulsion range, or in one of the propulsion ranges with the operator request including zero input to the accelerator pedal and minimal or slight input to the brake pedal.

Engine operation may be described in context of several control variables, including engine operation state, engine fueling state, and engine cylinder state. The engine operation control variable includes either the ON or OFF state. The engine fueling control variable includes either the fueled state or the FCO state. The engine cylinder control variable includes either the all-cylinder state or the cylinder deactivation state. Transmission operation may be described in context of a control variable related to a selected fixed gear state. In one embodiment, transmission operation may be described in context of a control variable related to one of a fixed gear mode, a continuously-variable mode or an electrically-variable mode, depending upon the specific configuration of the transmission.

Operation of an embodiment of the powertrain 100 described with reference to FIG. 1 includes changing one of the control variables to optimize operation, including changing a control variable to reduce power loss, to reduce power consumption, and improve performance. As such, a control variable may change in response to a change in an operating condition, including by way of example an input from the vehicle operator, an input related to external operating conditions, or an input related to operation of the powertrain system 20. Monitored inputs from the vehicle operator may include inputs communicated via the accelerator pedal 15 or the brake pedal 16. Monitored inputs related to operating conditions include inputs related to a change in road load, such as beginning to operate on an inclined road surface. Monitored inputs related to operation of the powertrain system 20 may include, for example, a change in SOC of the battery 25 or a system fault.

A change in a control variable, e.g., a change between engine ON and OFF states or a change between fixed transmission gear ratios, may include some hysteresis to minimize state transitions that may lead to operator dissatisfaction and/or affect service life of one or more components such as electric starter motors and the like. However, continued operation within a hysteresis window at a non-optimal state may increase power consumption.

Figure 2:
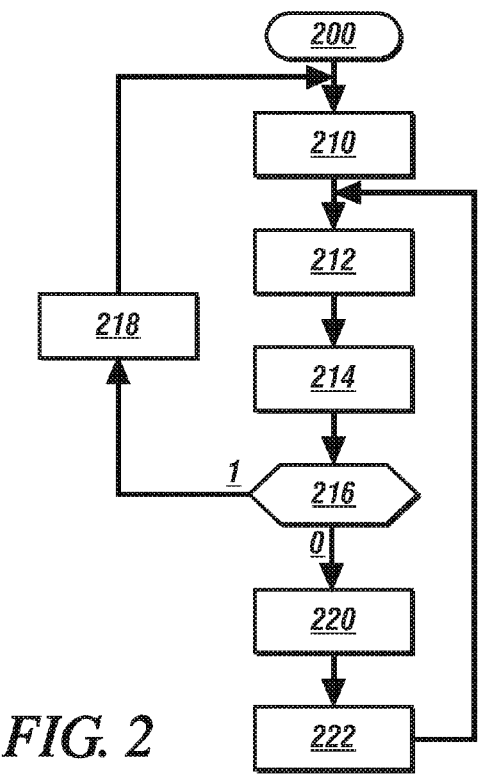
FIG. 2 schematically shows a state selection routine for selecting a preferred state of a control variable representing controllable powertrain element, wherein the preferred state may be selected based upon a state transition threshold and a hysteresis window that includes a time decaying element, in accordance with the disclosure.

FIG. 2 schematically shows a state selection routine 200 for selecting a preferred state of a control variable representing controllable powertrain element, wherein the preferred state may be selected based upon a state transition threshold and a hysteresis window that includes a time decaying element, employing an embodiment of the system described hereinabove. Table 1 is provided as a key wherein the numerically labeled blocks and the corresponding functions are set forth as follows, corresponding to the state selection routine 200.

TABLE 1

| BLOCK | BLOCK CONTENTS |
|---|---|
| 200 | State Selection Routine |
| 210 | Set initial state transition threshold and an initial hysteresis band at t = 0 |
| 212 | Monitor powertrain operation |
| 214 | Select preferred state based upon a comparison of the monitored powertrain operation, the initial state transition threshold and the hysteresis band |
| 216 | Is state transition commanded? |
| 218 | Execute state transition |
| 220 | Increment time t |
| 222 | Decay hysteresis band at incremented time t |

The state selection routine 200 is periodically executed during powertrain operation to control a control variable associated with a powertrain element that is operative in one of a plurality of controllable states. By way of example, the control variable may include engine ON/OFF states, a transmission gear state associated with operation of a fixed gear transmission, and other powertrain states.

In operation, one or a plurality of initial state transition thresholds that are related to one or more operating parameters for time t=0 are set along with an initial hysteresis band (210). The initial state transition threshold preferably represents an optimal threshold for the operating parameter for transitioning from a first state of the control variable to a second state of the control variable, which may be selected to minimize power loss or maximize fuel economy in the powertrain system. The initial hysteresis band represents plus and/or minus magnitudes for the operating parameter, in the form of plus and/or minus percent change in the initial state transition threshold, or plus and/or minus differential values from the initial state transition threshold. Alternatively, this may be another suitable change in the threshold, linear or non-linear. By way of a non-limiting example, the initial hysteresis band may include an upper hysteresis transition threshold that is 10% greater than the initial state transition threshold, i.e., +10%, and a lower hysteresis transition threshold that is 10% less than the initial state transition threshold, i.e., −10%. The magnitude of the initial hysteresis band is preferably set to a magnitude that minimizes occurrence of changes in the control variable when the powertrain system 10 is operating under conditions where the operating parameter for the control variable of interest is at or near its initial state transition threshold. When the control variable is a transmission gear state, the operating parameters may be related to engine or vehicle speed and road load, and such transition thresholds may include an optimum speed/load transition point for executing a transmission shift between adjacent fixed gear states. The hysteresis bands may relate to speed and/or load points that relate to executing a transmission upshift and executing a transmission downshift between adjacent fixed gear states. A hysteresis band may also be referred to as a deadband.

When the control variable relates to selecting an engine ON or OFF state, the operating parameter may be related to engine load, and such state transition thresholds may include an optimum speed/load transition point for executing an autostart or autostop routine. The hysteresis bands may relate to speed and/or load points that relate to executing the autostart routine when the engine 40 is OFF, and executing the autostop routine when the engine 40 is ON.

When the control variable relates to selecting engine cylinder deactivation, the operating parameter may be related to engine load, and such state transition thresholds may include an optimum speed/load transition point for engaging or disengaging cylinder deactivation. The hysteresis bands may relate to engine speed and/or engine load points that relate to commanding operation in the cylinder deactivation state when the engine 40 is operating in an all-cylinder state, and commanding operation in the all-cylinder state when the engine 40 is operating in the cylinder deactivation state.

When the control variable relates to selecting engine fuel cutoff (FCO), the operating parameter may be related to engine load, and such state transition thresholds may include an optimum speed/load transition point for engaging or disengaging FCO. The hysteresis bands may relate to speed and/or load points that relate to commanding operation in the FCO state when the engine 40 is fueled in the ON state, and commanding operation in the fueled state when the engine 40 operating in the FCO state.

Operation of the powertrain 100 is monitored (212) and a preferred control variable is selected based upon the monitored operation in relation to the state transition threshold that includes the optimal transition threshold adjusted by upper and lower hysteresis transition thresholds of the hysteresis band with associated hysteresis decay, if any (214). When the preferred control variable differs from the present control variable for the powertrain element (216)(1), a state transition may be commanded (218) and the operation of the powertrain system continued, including setting the initial state transition thresholds related to the operating parameters for time t=0 and the initial hysteresis windows (210).

When the preferred control variable is the same as the present control variable, (216)(0), elapsed time in state t is incremented (218) and the hysteresis band is decayed (220). As used herein, the terms 'decay', 'decaying' and related terms indicate a time-based or event-based change in magnitude towards an ideal value or a nominal value, wherein the magnitude may be expressed as a percentage of the ideal or nominal value, or a numerical value related to the ideal or nominal value. Thus, by way of example, decaying the hysteresis band is indicated by time-based or event-based changes in either or both the upper and lower hysteresis transition thresholds towards the initial state transition threshold. As such, a lower hysteresis transition threshold decays by increasing in magnitude towards the initial state transition threshold and an upper hysteresis transition threshold decays by decreasing in magnitude towards the initial state transition threshold. The hysteresis band is preferably decayed at a rate that takes into consideration factors related to minimizing unnecessary transitions while achieving optimum power consumption, including minimizing power loss. By way of example, the hysteresis band may decay at a rate of 0.1%/second, with the hysteresis band eliminated after 100 seconds of operation. During subsequent iterations of the state selection routine 200, the likelihood of a state transition may increase if the operating parameter is near the initial state transition threshold.

Figure 3:
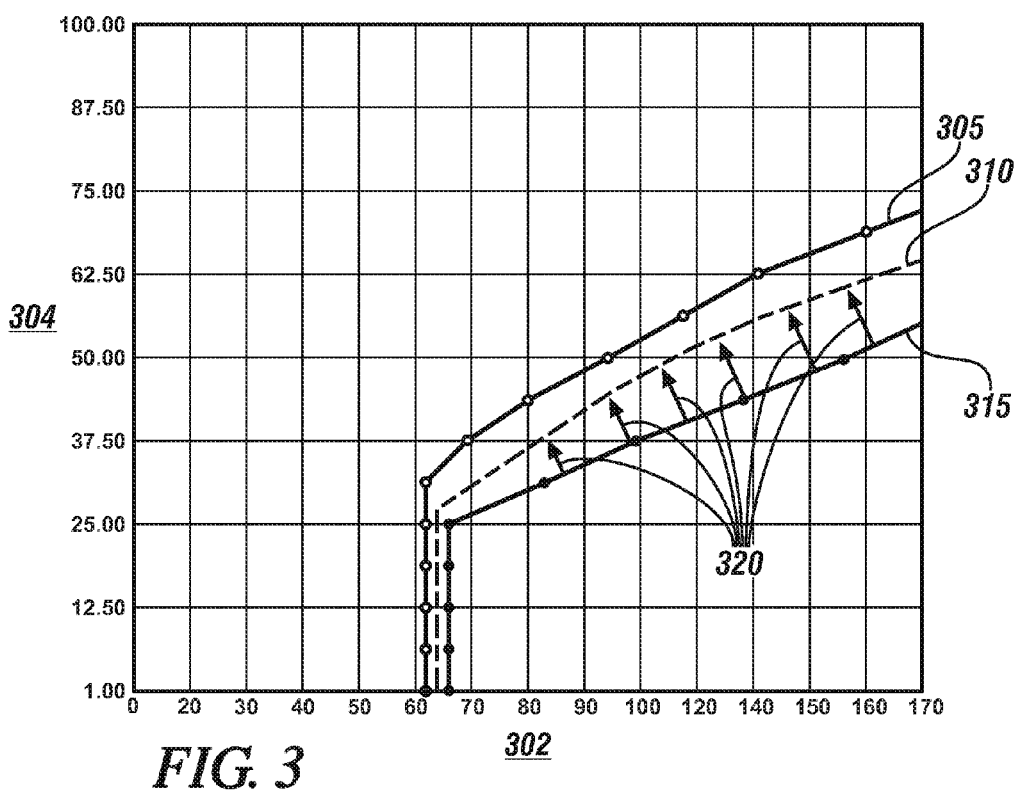
FIG. 3 graphically shows data representing an initial state transition threshold, a lower hysteresis state transition threshold and an upper hysteresis state transition threshold related to transmission gear shift in relation to state parameters of speed and load, in accordance with the disclosure.

FIG. 3 graphically shows data representing an initial state transition threshold 310, a lower hysteresis state transition threshold 315 and an upper hysteresis state transition threshold 305 for a transmission gear shift in relation to state parameters related to speed 302, which is shown on the horizontal axis and load 304, which is shown on the vertical axis. The initial state transition threshold 310 is the preferred shift point curve. The upper hysteresis transition threshold 305 relates to speed/load shift points that result in an upshift and the lower hysteresis transition threshold 315 relates to speed/load shift points that result in a downshift. Decay of the lower hysteresis state transition threshold 315 is indicated by arrows 320.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling a control variable for an element of a powertrain system, the method comprising:
   determining an initial state transition threshold and an associated hysteresis band for an operating parameter related to the control variable;
   decaying the hysteresis band for the operating parameter based upon operation of the element of the powertrain system in a present state of the control variable;
   selecting a preferred state for the control variable of the element of the powertrain system based upon a comparison of the operating parameter and the initial state transition threshold combined with the decayed hysteresis band for the operating parameter; and
   controlling the element of the powertrain system to the preferred state for the control variable based upon the comparison of the operating parameter and the initial state transition threshold combined with the decayed hysteresis band for the operating parameter.

2. The method of claim 1, wherein the element of the powertrain system comprises an internal combustion engine, wherein the control variable comprises an engine operation state, and wherein the preferred state for the control variable includes one of an ON state and an OFF state.

3. The method of claim 1, wherein the element of the powertrain system comprises an internal combustion engine, wherein the control variable comprises an engine fueling state, and wherein the preferred state for the control variable includes one of a fueled state and a fuel cutoff state.

4. The method of claim 1, wherein the element of the powertrain system comprises an internal combustion engine, wherein the control variable comprises an engine cylinder state, and wherein the preferred state for the control variable includes one of an all-cylinder state and a cylinder deactivation state.

5. The method of claim 1, wherein the element of the powertrain system comprises a fixed-gear transmission, wherein the control variable comprises an engine fueling state, and wherein the preferred state for the control variable includes one of a plurality of fixed gear states.

6. The method of claim 1, wherein the element of the powertrain system comprises an electrically-variable transmission, wherein the control variable comprises a transmission state, and wherein the preferred state for the control variable includes one of a fixed gear state and an electrically-variable state.

7. The method of claim 1, wherein decaying the hysteresis band for the operating parameter based upon operation of the element of the powertrain system in a present state of the control variable comprises decaying the hysteresis band for the operating parameter based upon an elapsed time of operation of the element of the powertrain system in a present state of the control variable.

8. The method of claim 7, wherein decaying the hysteresis band for the operating parameter based upon the elapsed time of operation of the element of the powertrain system in the present state of the control variable comprises increasing a lower hysteresis transition threshold towards the initial state transition threshold in relation to the elapsed time of operation.

9. The method of claim 7, wherein decaying the hysteresis band for the operating parameter based upon the elapsed time of operation of the element of the powertrain system in the present state of the control variable comprises decreasing an upper hysteresis transition threshold towards the initial state transition threshold in relation to the elapsed time of operation.

10. The method of claim 7, wherein decaying the hysteresis band for the operating parameter based upon an elapsed time of operation of the element of the powertrain system in a present state of the control variable comprises decaying the hysteresis band at a rate of 0.1% of the initial state transition threshold per second.

11. The method of claim 1, wherein the initial state transition threshold comprises an optimal threshold for the operating parameter for transitioning between a first state of the control variable and a second state of the control variable, wherein the optimal threshold is selected to minimize power loss during operation of the powertrain system.

12. A method for controlling a control variable for a powertrain system, the method comprising:
determining an initial state transition threshold for an operating parameter of the powertrain system;
determining a hysteresis band for the operating parameter, said hysteresis band being decayed based upon operation of the powertrain system in a present state of the control variable;
selecting a preferred state for the control variable of the powertrain system based upon a comparison of the operating parameter and the initial state transition threshold combined with the decayed hysteresis band for the operating parameter; and
controlling the powertrain system to the preferred state for the control variable.

13. The method of claim 12, wherein decaying the hysteresis band for the operating parameter based upon operation of the powertrain system in a present state of the control variable comprises decaying the hysteresis band for the operating parameter based upon an elapsed time of operation of the powertrain system in a present state of the control variable.

14. The method of claim 13, wherein decaying the hysteresis band for the operating parameter based upon the elapsed time of operation of the powertrain system in the present state of the control variable comprises increasing a lower hysteresis transition threshold towards the initial state transition threshold in relation to the elapsed time of operation.

15. The method of claim 13, wherein decaying the hysteresis band for the operating parameter based upon the elapsed time of operation of the powertrain system in the present state of the control variable comprises decreasing an upper hysteresis transition threshold towards the initial state transition threshold in relation to the elapsed time of operation.

16. The method of claim 13, wherein decaying the hysteresis band for the operating parameter based upon an elapsed time of operation of the powertrain system in a present state of the control variable comprises decaying the hysteresis band at a rate of 0.1% of the initial state transition threshold per second.

17. The method of claim 12, wherein the initial state transition threshold comprises an optimal threshold for the operating parameter for transitioning between a first state of the control variable and a second state of the control variable, wherein the optimal threshold is selected to minimize power loss during operation of the powertrain system.

18. A powertrain system, comprising:
an internal combustion engine coupled to a transmission to transfer torque to a driveline; and
a control system including executable code for controlling the internal combustion engine and the transmission, the executable code including machine-readable instructions for controlling a control variable of one of the internal combustion engine and the transmission, including:
code to determine an initial state transition threshold and an associated hysteresis band for an operating parameter related to the control variable;
code to decay the hysteresis band for the operating parameter based upon operation of an element of the powertrain system in a present state of the control variable;
code to select a preferred state for the control variable of the element of the powertrain system based upon a comparison of the operating parameter and the initial state transition threshold combined with the decayed hysteresis band for the operating parameter; and code to control the element of the powertrain system to the preferred state for the control variable.

* * * * *